No. 664,572. Patented Dec. 25, 1900.
I. S. McDOUGALL.
APPARATUS FOR PURIFYING FEED WATER.
(Application filed Aug. 21, 1900.)

(No Model.) 4 Sheets—Sheet 1.

WITNESSES:

INVENTOR
Isaac Shimwell McDougall
BY Richards & Co
ATTORNEYS

No. 664,572. Patented Dec. 25, 1900.
I. S. McDOUGALL.
APPARATUS FOR PURIFYING FEED WATER.
(Application filed Aug. 21, 1900.)

(No Model.) 4 Sheets—Sheet 2.

WITNESSES:

INVENTOR
Isaac Shimwell McDougall
BY
Richardson Co
ATTORNEYS

UNITED STATES PATENT OFFICE.

ISAAC SHIMWELL McDOUGALL, OF DIDSBURY, ENGLAND.

APPARATUS FOR PURIFYING FEED-WATER.

SPECIFICATION forming part of Letters Patent No. 664,572, dated December 25, 1900.

Application filed August 21, 1900. Serial No. 27,584. (No model.)

*To all whom it may concern:*

Be it known that I, ISAAC SHIMWELL MC-DOUGALL, a subject of the Queen of Great Britain and Ireland, and a resident of High Bank, Didsbury, in the county of Lancaster, England, have invented a certain new and useful Improvement in Apparatus for the Purification of Feed-Water, (for which I have filed an application for patent in Great Britain, No. 22,898, dated November 16, 1899,) of which the following is a specification.

My invention relates to improvements in apparatus for purifying feed-water for supplying steam-boilers and for like purposes, the object being to form the fatty acids, oils, and other impurities held in suspension or solution in the water into insoluble compounds which can afterward be readily precipitated, separated, or filtered.

My invention consists in the combination, with a filter, of a precipitation vessel containing zinc blocks or cuttings and heated by a steam pipe or pipes, the vessel being so arranged that the water to be purified can be passed over the steam-pipes and so heated and thereafter passed through or between the pieces of zinc, so as to be acted upon by the zinc.

My invention further consists in details of construction to be hereinafter described.

Figure 1:
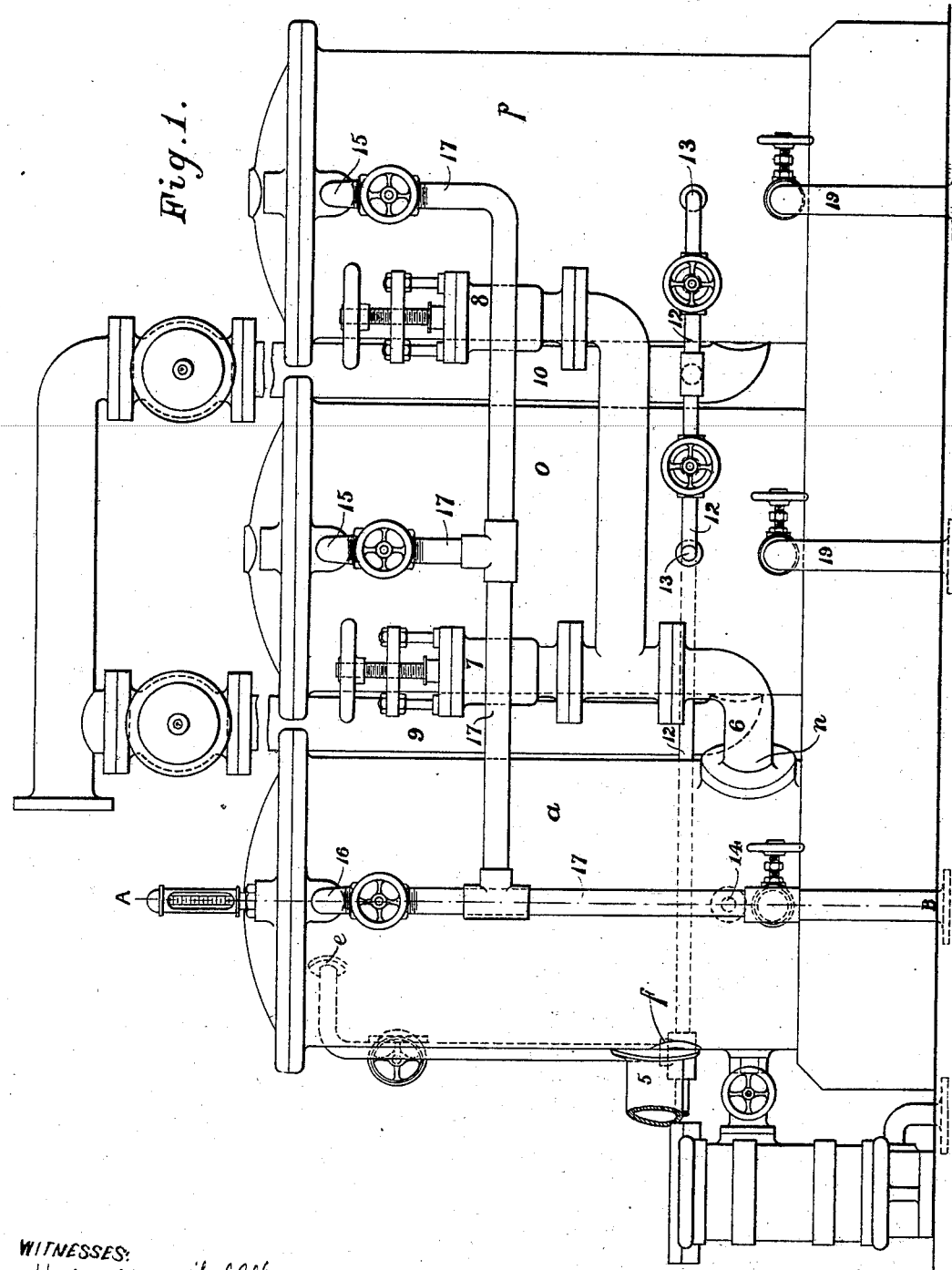
Figure 2:
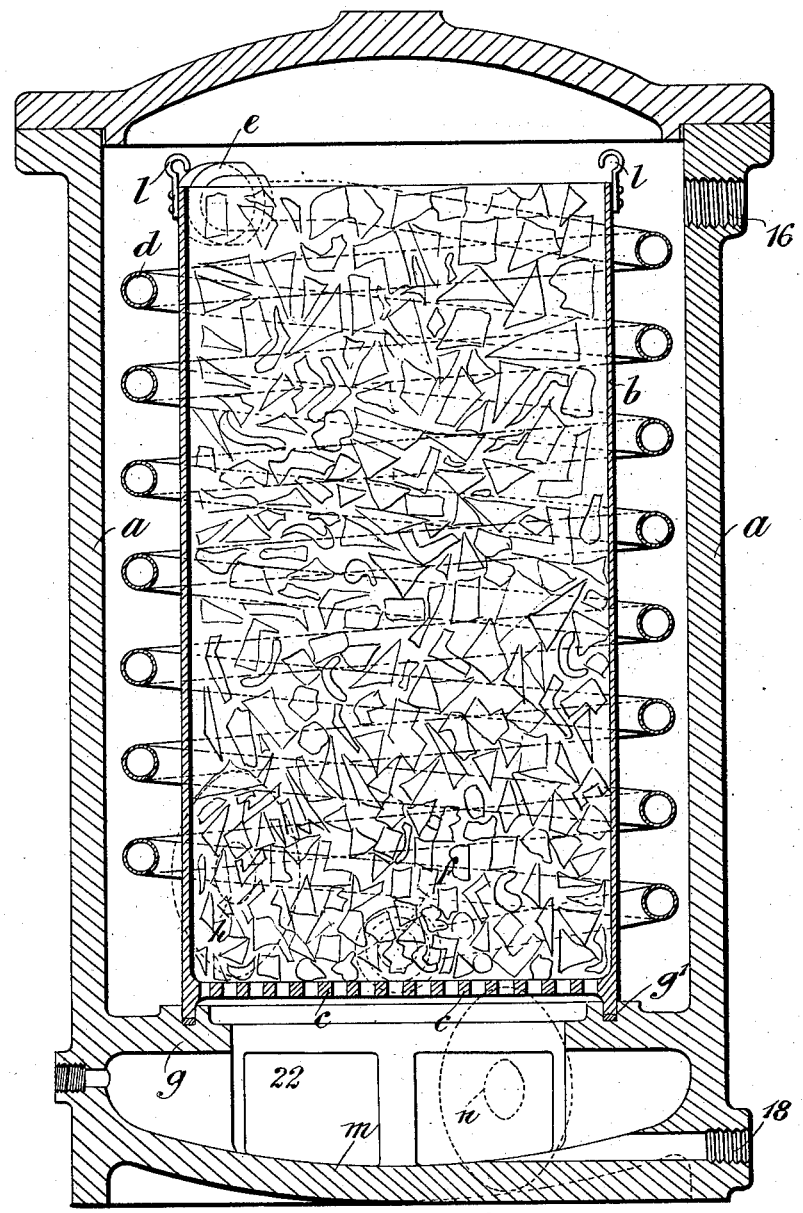
Figure 3:
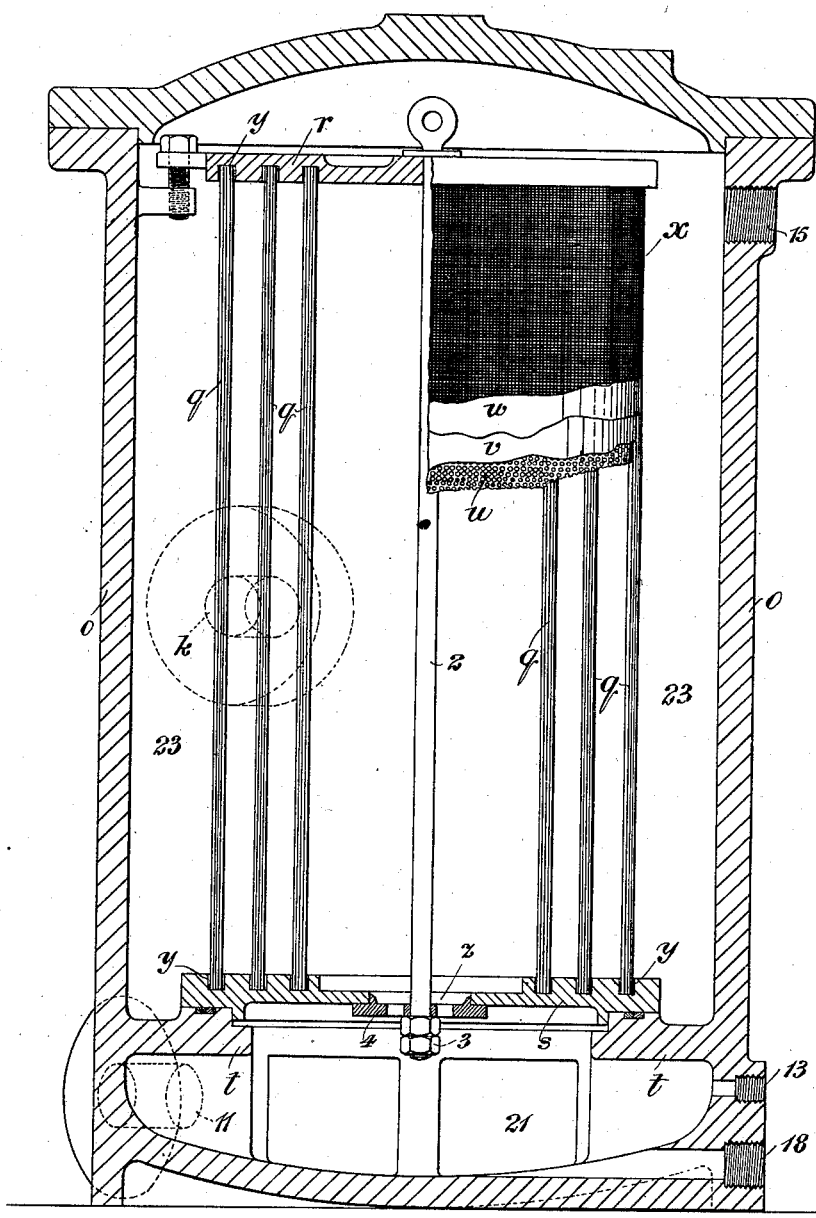
Figure 4:
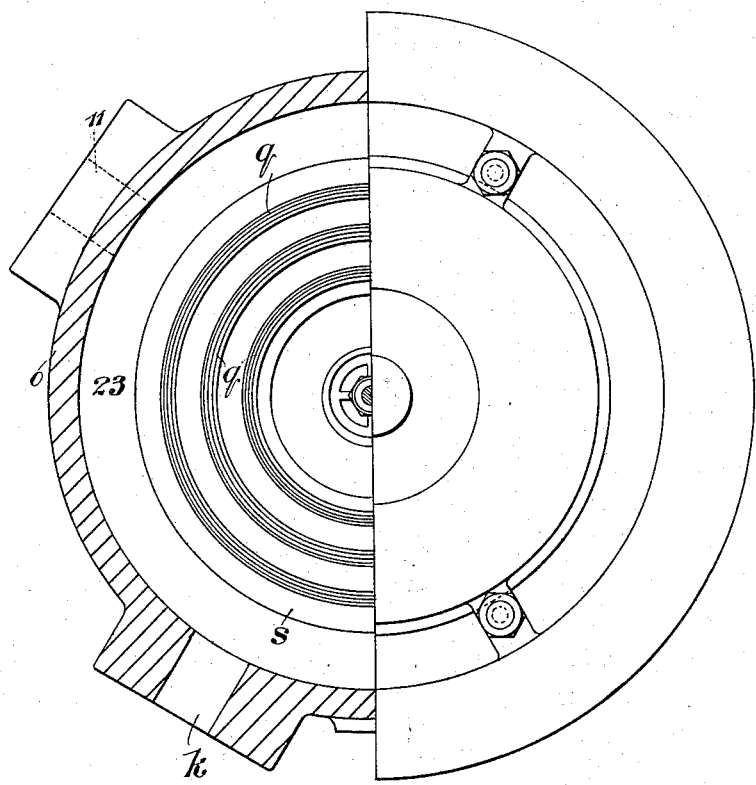

In the accompanying drawings, which illustrate one form of my apparatus, Figure 1 shows the apparatus in elevation. Fig. 2 is a sectional elevation of the precipitation vessel, the section being taken on the line A B of Fig. 1. Fig. 3 is a sectional elevation of a filtering vessel. Fig. 4 is a plan, partly in section, of the same filtering vessel.

The precipitation vessel $a$, Figs. 1 and 2, is of cylindrical form and contains an inner cylindrical case $b$, which is open at the top and has a perforated bottom $c$. In the annular space between the space $b$ and the inside of the vessel $a$ is placed a pipe-coil $d$, connected at its inlet and outlet, respectively, to flanged apertures $e$ and $f$, provided in the side of the vessel $a$. The case $b$ is supported upon an annular shelf $g$, formed upon the interior of the outer vessel $a$, the bottom of the case engaging within a groove provided with suitable packing $g'$ to form a water-tight joint, thus forming a chamber 22 in the lower part of the vessel $a$. The interior of the casing is filled with lump zinc or zinc cuttings, and in order that the case may be readily hoisted out of the containing vessel for cleaning or recharging with zinc hooks $l$ or other suitable means may be provided to which the chains or ropes of lifting-tackle may be attached.

The water to be purified enters the apparatus at $h$ and rises around the coil $d$, thus becoming heated to a high temperature before it overflows into the interior of the case $b$. The heated water percolates through the mass of loosely-packed zinc blocks or cuttings and chemical and electrolytic action is set up. The fatty acids, oils, or other impurities held in solution or suspended in a fine state of division in the water enter into combination with the zinc, so as to form insoluble compounds. These compounds are carried down with the water through the perforated bottom $c$ toward the outlet $n$ and are partially separated and precipitated on the bottom $m$ of the vessel $a$, the remainder being subsequently removed in the filtering vessels $o$ and $p$ used in conjunction with the precipitation vessel $a$.

In order that the cleaning may be effected without interrupting the continuous filtration of the feed-water, two filtering vessels $o$ and $p$ are provided, valves 7 and 8 being arranged so that one of the filters may be shut off from the circulation while the other remains in action. The filtering vessels $o$ and $p$ are cylindrical and contain cylindrical filtering-diaphragms $q$, which are mounted between two disks $r$ and $s$, suspended within each filtering vessel. The lower disk $s$ is perforated at $z$ and forms a water-tight joint with an annular shelf $t$, formed upon the interior of the containing vessel, thus dividing the vessel into two chambers 21 and 23 in communication with each other only through the filtering-diaphragms $q$. Each diaphragm consists of an inner cylindrical shell of perforated metal or other suitable material $u$, around which is arranged a layer of jute $v$ and around this a layer of filter-paper $w$. Outside of the filter-paper I may provide a covering $x$, of wire-gauze or perforated metal or a combination of metal netting and jute. I may bind or attach the component parts of a diaphragm $q$ together by suitable clips or other ordinary fastening devices. The diaphragms $q$ are preferably held in annular grooves $y$ in the disks $r$ and $s$, which can be pulled together by a bolt 2, provided with nuts 3, and a spider 4, which is fitted in the hole $z$ in the lower disk.

I may, if desired, provide a layer of jute outside the filter-paper to protect the latter, or I may use different arrangements of filter-paper and jute without departing from my invention.

The water to be purified enters the precipitation vessel $a$ by the pipe 5 and leaves the vessel by the pipe 6, which is connected to the precipitation vessel $a$ below the shelf $g$, Fig. 2. The pipe 6 conveys the water to one or other of the filtering vessels $o$ and $p$ by way of the valves 7 and 8, the water entering at the apertures $k$ in the sides of the vessels. (See Figs. 3 and 4.) The filtered water after passing in series through the several filtering-diaphragms leaves the vessels by the pipes 9 and 10, which are connected to the apertures 11, situated below the shelves $t$.

Steam blow-through pipes 12 may be provided, which are connected to the filtering vessels at 13 and to the precipitation vessel at 14. The blow-through steam exhausts from the filtering vessels at 15 and from the precipitating vessel at 16 and passes away by the pipes 17 to a drain-pipe. Holes 18 are provided at the bottom of both filtering and precipitation vessels for the removal of sludge, the holes in the filtering vessels being in communication with the drain-pipes by the pipes 19 and the holes in the precipitation vessel in communication with the pipe 17. Suitable valves are provided for controlling the blow-through.

Having thus described my invention, what I claim as new, and desire to secure by Letters Patent, is—

1. In apparatus for purifying feed-water, in combination, a precipitation vessel having a shelf near its lower end, a steam-pipe coil adapted to heat the water in said vessel, an inner case having an open top and a perforated bottom and adapted to hold pieces of zinc and to rest water-tight on the aforesaid shelf so as to form a chamber below the shelf, an aperture for the inflowing water situated in the side of the precipitation vessel above the shelf, a filtering vessel, a pipe connected to said filtering vessel and to an aperture in the chamber below the shelf in the precipitation vessel and adapted to convey water from the precipitation vessel to the filtering vessel, and filtering-diaphragms within said filtering vessel adapted to filter the water coming from the precipitation vessel, substantially as and for the purpose described.

2. In apparatus for purifying feed-water, in combination, a precipitation vessel having a shelf near its lower end, a steam-pipe coil adapted to heat the water in said vessel, an inner case $b$ having an open top and a perforated bottom $c$ and adapted to hold pieces of zinc and to rest water-tight on the aforesaid shelf so as to form a chamber 22 below the shelf, an aperture $h$ for the inflowing water situated in the side of the precipitation vessel above the shelf, a filtering vessel, a pipe adapted to convey the water to the filtering vessel from the aforesaid chamber 22 in the precipitation vessel, filtering-diaphragms within said filtering vessel, the diaphragms comprising layers of filter-paper and jute, substantially as and for the purpose described.

In witness whereof I have hereunto set my hand in presence of two witnesses.

ISAAC SHIMWELL McDOUGALL.

Witnesses:
R. M. NEILSON,
E. C. RIGHTON.